US007196859B2

(12) United States Patent
Olson (10) Patent No.: US 7,196,859 B2
(45) Date of Patent: Mar. 27, 2007

(54) PROCESSING TECHNIQUES FOR TIME-BASED SERVO PATTERNS

(75) Inventor: Alan R. Olson, Cottage Grove, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/888,857

(22) Filed: Jul. 9, 2004

(65) Prior Publication Data

US 2006/0007570 A1    Jan. 12, 2006

(51) Int. Cl.
*G11B 5/02* (2006.01)
*G11B 20/06* (2006.01)

(52) U.S. Cl. .............................. 360/29; 360/31; 360/51; 360/78.01; 360/48

(58) Field of Classification Search ...................... None
See application file for complete search history.

(56) References Cited

U.S. PATENT DOCUMENTS

| | | | | |
|---|---|---|---|---|
| 4,977,470 A * | 12/1990 | Murayama et al. | ...... | 360/77.04 |
| 5,065,263 A * | 11/1991 | Yoshida et al. | .......... | 360/77.03 |
| 5,241,433 A * | 8/1993 | Anderson et al. | ........ | 360/77.04 |
| 5,274,569 A * | 12/1993 | Prasad | .......................... | 702/66 |
| 5,552,942 A * | 9/1996 | Ziperovich et al. | ........... | 360/51 |
| 5,689,384 A * | 11/1997 | Albrecht et al. | ......... | 360/77.12 |
| 5,835,295 A * | 11/1998 | Behrens | ....................... | 360/51 |
| 5,848,047 A * | 12/1998 | Fujimoto | .................. | 369/47.18 |
| 5,987,082 A * | 11/1999 | Fujimoto | ..................... | 375/355 |
| 5,987,392 A * | 11/1999 | Tucker et al. | .................. | 702/66 |
| 6,144,513 A * | 11/2000 | Reed et al. | ..................... | 360/51 |
| 6,241,433 B1 * | 6/2001 | Rydberg et al. | ............. | 408/233 |
| 6,421,198 B1 * | 7/2002 | Lamberts et al. | ......... | 360/77.04 |
| 6,429,995 B1 * | 8/2002 | Dobbek et al. | .......... | 360/77.08 |
| 6,476,997 B2 * | 11/2002 | Fukushima et al. | ....... | 360/77.08 |
| 6,529,460 B1 * | 3/2003 | Belser | ...................... | 369/59.21 |
| 6,545,836 B1 * | 4/2003 | Ioannou et al. | .......... | 360/77.06 |
| 6,667,840 B1 * | 12/2003 | Cheong et al. | ................ | 360/31 |
| 6,683,737 B2 * | 1/2004 | Gong et al. | .................... | 360/31 |
| 6,700,731 B2 * | 3/2004 | Chew | ....................... | 360/77.08 |
| 6,738,210 B1 * | 5/2004 | Olson et al. | ................... | 360/53 |
| 6,763,063 B1 * | 7/2004 | Edstrom | ...................... | 375/224 |
| 6,853,514 B2 * | 2/2005 | Li et al. | ................... | 360/77.04 |
| 6,906,886 B2 * | 6/2005 | He et al. | .................. | 360/77.01 |
| 6,982,849 B2 * | 1/2006 | Nguyen et al. | ........... | 360/77.08 |
| 7,035,040 B2 * | 4/2006 | Molstad et al. | .......... | 360/77.12 |
| 2003/0058557 A1 * | 3/2003 | Morozumi et al. | ........... | 360/29 |
| 2004/0174132 A1 * | 9/2004 | Johnson et al. | ............. | 318/652 |
| 2004/0213337 A1 * | 10/2004 | Li et al. | ..................... | 375/222 |
| 2005/0068650 A1 * | 3/2005 | Annampedu et al. | ......... | 360/39 |

* cited by examiner

*Primary Examiner*—William Korzuch
*Assistant Examiner*—Dismery Mercedes
(74) *Attorney, Agent, or Firm*—Eric D. Levinson (57) ABSTRACT

Techniques are described for accurately processing playback signals of time-based servo patterns recorded on a data storage medium. In particular, techniques are described for determining values for signal peaks within a playback signal of a time-based servo pattern by applying interpolation to data points in proximity to each of the signal peaks. At least three data points are identified in proximity to a desired peak to be detected within the playback signal. A value is calculated for the desired peak based on interpolation of the at least three data points. A playback signal of a time-based servo pattern may include a sequence of signal peaks. A time-based servo pattern may be detected based on lengths of time measured between consecutive peaks in the sequence of peaks. A position error signal (PES) may be generated based on the values calculated for each of the sequence of peaks.

20 Claims, 8 Drawing Sheets

```
                    ┌──────────────────────────────────────────┐ 70
                    │  SAMPLE DATA POINTS FROM PLAYBACK SIGNAL │
                    └──────────────────────────────────────────┘
                                         │
                                         ▼
                    ┌──────────────────────────────────────────┐ 72
                    │  IDENTIFY THREE SAMPLED DATA POINTS IN   │
                    │   CLOSEST PROXIMITY TO DESIRED PEAK      │
                    └──────────────────────────────────────────┘
                                         │
                                         ▼
                    ┌──────────────────────────────────────────┐ 74
                    │  CALCULATE VALUE FOR DESIRED PEAK BASED ON│
                    │  QUADRATIC INTERPOLATION OF THREE SAMPLED │
                    │              DATA POINTS                 │
                    └──────────────────────────────────────────┘
```

┌──────────────────────────────────────────┐ 80
                    │   CONTINUOUSLY SELECT SAMPLED DATA POINTS│
                    └──────────────────────────────────────────┘
                                         │
                                         ▼
                    ┌──────────────────────────────────────────┐ 82
                    │   COMPUTE COEFFICIENTS OF QUADRATIC CURVE│
                    │   At²+Bt+C FOR EACH SET OF THREE DATA POINTS│
                    └──────────────────────────────────────────┘
                                         │
                                         ▼
                    ┌──────────────────────────────────────────┐ 84
                    │   ELIMINATE DATA POINTS WITH AMPLITUDES LESS│
                    │          THAN THRESHOLD AMPITUDE         │
                    └──────────────────────────────────────────┘
                                         │
                                         ▼
                    ┌──────────────────────────────────────────┐ 86
                    │  VERIFY SIGN CHANGE OCCURS IN B AND MINIMIZE│
                    │                VALUE OF |B|              │
                    └──────────────────────────────────────────┘
```

FIG. 10

… # PROCESSING TECHNIQUES FOR TIME-BASED SERVO PATTERNS

TECHNICAL FIELD

The invention relates to data storage media that makes use of time-based servo patterns, and more particularly, techniques for improving the readout of the time-based servo patterns.

BACKGROUND

Data storage media are commonly used for storage and retrieval of data, and come in many forms, such as magnetic tape, magnetic disks, optical tape, optical disks, holographic disks, cards or tape, and the like. Magnetic tape media remains an economical medium for storing large amounts of data. In magnetic tape, data is typically stored as magnetic signals that are magnetically recorded on the medium surface. The data stored on the magnetic tape is often organized along "data tracks," and read/write heads are positioned relative to the data tracks to write data to the tracks or read data from the tracks.

Servo patterns refer to signals or other recorded marks on the medium that are used for tracking purposes. In magnetic tape, the servo patterns are recorded in specialized tracks on the medium, called "servo tracks" to provide reference points relative to the data tracks. A servo controller interprets detected servo patterns and generates position error signals. The position error signals are used to adjust the lateral distance of the read/write head relative to the data tracks so that the read/write head is properly positioned along the data tracks for effective reading and/or writing of the data to the data tracks.

A servo writer writes the servo patterns and may include a magnetic servo recording head and various transport guides to precisely guide the medium over the head. If the medium movement relative to the servo recording head is not well controlled, then the recorded servo pattern may not provide reliable positioning information during use of the medium. For these reasons, servo writers typically use verification heads and electronics to insure that the servo pattern is accurately recorded. In particular, a servo verify head is used to read back the servo markings to detect flaws in the written servo signal.

Time-based servo techniques refer to servo techniques that make use of time variables. Time-based servo techniques are particularly effective for magnetic tape, which typically feeds past transducer heads at a constant velocity. For example, N-shaped servo markings, servo markings such as "<<<>>>" or "////\\\\," or the like, have been developed for time-based servo techniques. Such markings are typically formed in a servo track of the magnetic tape.

When time-based servo techniques are used, the time offset between detection of two or more servo marks can be translated into a position error signal, which defines a lateral distance of the transducer head relative to a data track. The time between servo marks depends on the distance between the recorded servo marks and the velocity of the magnetic tape. In order to accurately measure the tracking error recorded into the servo pattern, the servo writer must have accurate tape velocity control, an accurate signal peak detector, and an accurate clock with which to measure time.

Traditional analog peak detection can provide accurate peak detection at low frequencies, but may suffer from inaccuracies, particularly as the signal frequency increases. Digital circuitry has been developed to measure time between signal peaks corresponding to the servo signals. This digital circuitry typically needs to operate at very high clock rates in order to achieve accurate readout of the servo signals. Some mixed analog and digital electronic components that can provide good readout capabilities also exist. However, new techniques for reading servo signals are highly desirable, particularly for next-generation magnetic media.

SUMMARY

In general, the invention is directed to techniques for accurately processing playback signals of time-based servo patterns recorded on a data storage medium. In particular, values for signal peaks within a playback signal of a time-based servo pattern are determined by applying interpolation to data points in proximity to each of the signal peaks. At least three data points are identified in proximity to a desired peak to be detected within the playback signal. A value is calculated for the desired peak based on interpolation of the at least three data points.

A playback signal of a time-based servo pattern may include a sequence of signal peaks. The processing method of the invention may be used to calculate values for each of the sequence of peaks. A position error signal (PES) may be generated based on the values calculated for each of the sequence of peaks. In the case of a servo verify head reading the time-based servo pattern, the PES may be detected over a substantial length of the data storage medium to verify that the PES remains substantially the same over the substantial length of the data storage medium. In the case of a servo read head reading the time-based servo pattern, a data read/write head may be moved in a transverse direction over the data storage medium based on the PES in order to properly align with a particular data track recorded on the data storage medium.

In one embodiment, the invention is directed to a method for processing a playback signal of a time-based servo pattern. The method includes identifying at least three data points in proximity to a desired peak to be detected within the playback signal of the time-based servo pattern, and calculating a value for the desired peak based on interpolation of the at least three data points.

In another embodiment, the invention is directed to a system to process a playback signal that corresponds to a time-based servo pattern recorded on a data storage medium. The system comprises a sampler, an interpolator, and a peak estimator. The sampler samples data points from the playback signal of the time-based servo pattern recorded on the medium. The interpolator identifies at least three sampled data points in proximity to a desired peak to be detected within the playback signal. The peak estimator calculates a value for the desired peak based on the at least three sampled data points.

In another embodiment, the invention is directed to a computer-readable medium comprising instructions that when executed in a programmable processor process a playback signal of a time-based servo pattern. The instructions cause the programmable processor to identify at least three data points in proximity to a desired peak to be detected within the playback signal of the time-based servo pattern, and calculate a value for the desired peak based on interpolation of the at least three data points.

The invention may be capable of providing one or more advantages. For example, the system of the invention can be implemented using widely available digital converters and programmable logic running at moderate speeds. The system may also be portable allowing processing of playback signals on a variety of tape transport systems. Furthermore, using interpolation for high speed, flexible servo pattern verification provides low manufacturing costs with high product quality. The invention also provides a noise floor, measured as the standard deviation of PES with a test signal, which may be more than one order of magnitude better than conventional servo verification systems.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
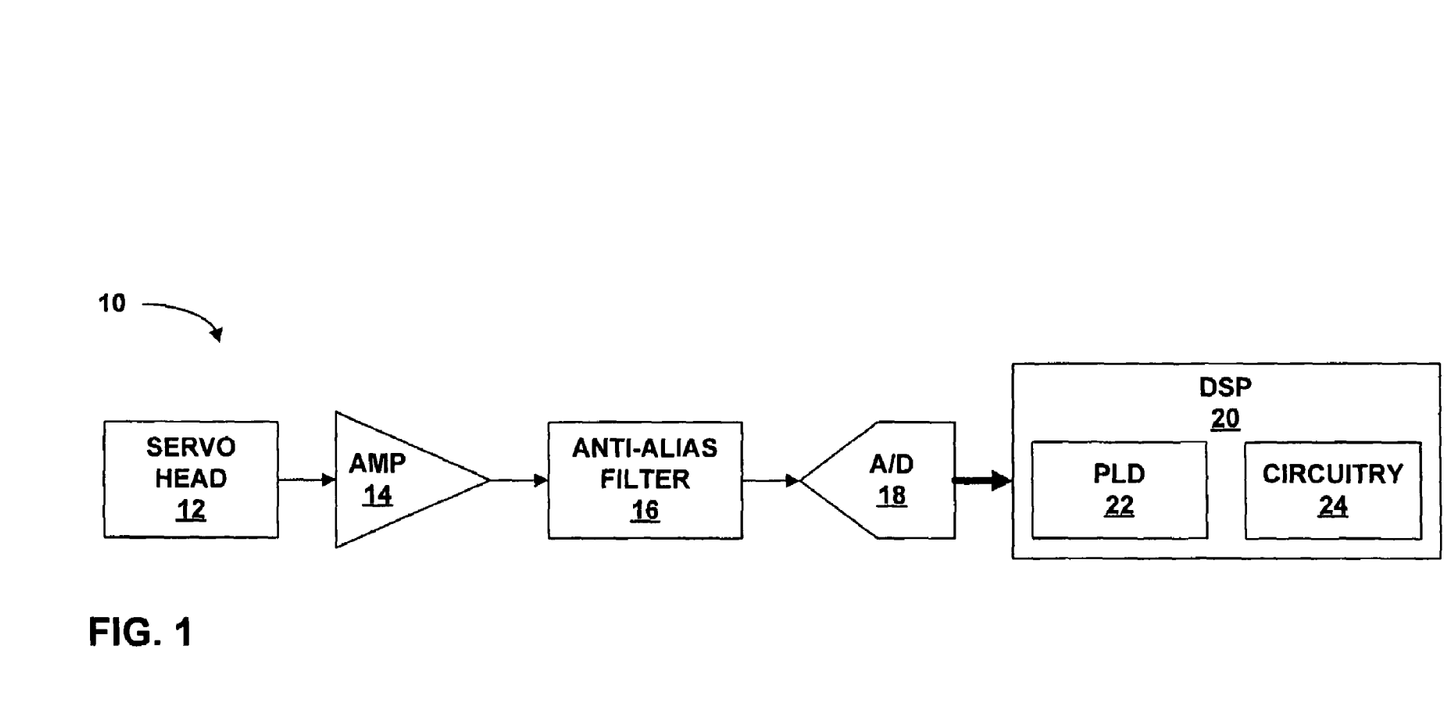
FIG. 1 is a block diagram illustrating a playback signal processing system for a time-based servo pattern recorded on a data storage medium.

FIG. 1 is a block diagram illustrating a playback signal processing system 10 for a time-based servo pattern recorded on a data storage medium. System 10 accurately processes playback signals generated from a time-based servo pattern. In particular, system 10 determines signal peaks within a playback signal by applying interpolation to data points in proximity to each of the signal peaks. System 10 includes a servo head 12, an amplifier 14, an anti-alias filter 16, an analog-to-digital (A/D) converter 18, and a digital signal processor (DSP) 20. DSP 20 includes a programmable logic device (PLD) 22 and circuitry 24 controlled by PLD 22.

Servo head 12 reads a time-based servo pattern recorded on a data storage medium passing over servo head 12. Servo head 12 generates a playback signal based on the time-based servo pattern. The playback signal is then amplified by amplifier 14 and filtered by anti-alias filter 16. Anti-alias filter 16 prepares the playback signal prior to sampling to avoid the adverse effects of aliasing. A/D converter 18 converts the analog playback signal to a digital signal by sampling the analog signal at a predefined rate.

As an example, a playback signal from a 16 m/s servo writer is sampled at 50 MHz. Data points obtained at a rate of 50 MHz do not always capture the signal peaks in the playback signal. Selecting the sampled data point closest to a desired peak may provide an inaccurate estimate of both a time and amplitude of the signal peak. By increasing the sampling rate, accuracy may likewise increase. However, estimation of the desired peak amplitude within 1 percent can require a sampling rate of 500 MHz. Digital converters and programmable logic capable of achieving sampling rates on the order of 500 MHz are not available at reasonable cost. For this reason, the invention provides for interpolation techniques that can identify the desired peaks without requiring higher sampling rates.

In particular, DSP 20 receives the sampled data points from A/D converter 18 and applies an interpolation algorithm stored in PLD 22 to the data points. PLD 22 drives circuitry 24 to perform interpolation of the sampled data points. DSP 20 identifies data points in proximity to a desired peak to be detected within the playback signal. DSP 20 then calculates a value, i.e., time and/or amplitude, for the desired peak based on interpolation of the sampled data points. The data points may be identified as being in closest proximity to the desired peak. In this way, an accurate signal peak estimate can be achieved while maintaining a relatively low sampling rate. The invention, for example, may significantly improve signal peak estimation at sampling rates of 50 MHz or less.

The playback signal may include a sequence of peaks to be detected. DSP 20 may generate a position error signal (PES) based on values calculated for each of the sequence of peaks identified within the playback signal. In some embodiments, servo head 12 may comprise a servo verify head. In that case, the PES may be detected over a substantial length of the data storage medium to verify that the PES remains substantially the same over the substantial length of the data storage medium. In other embodiments, servo head 12 may comprise a servo read head. In that case, a data read/write head associated with the servo read head can be moved in a transverse direction over the data storage medium, e.g., a cross-tape direction of magnetic tape, based on the PES. In this manner, the data read/write head can be properly aligned with a particular data track recorded on the data storage medium.

Figure 2:
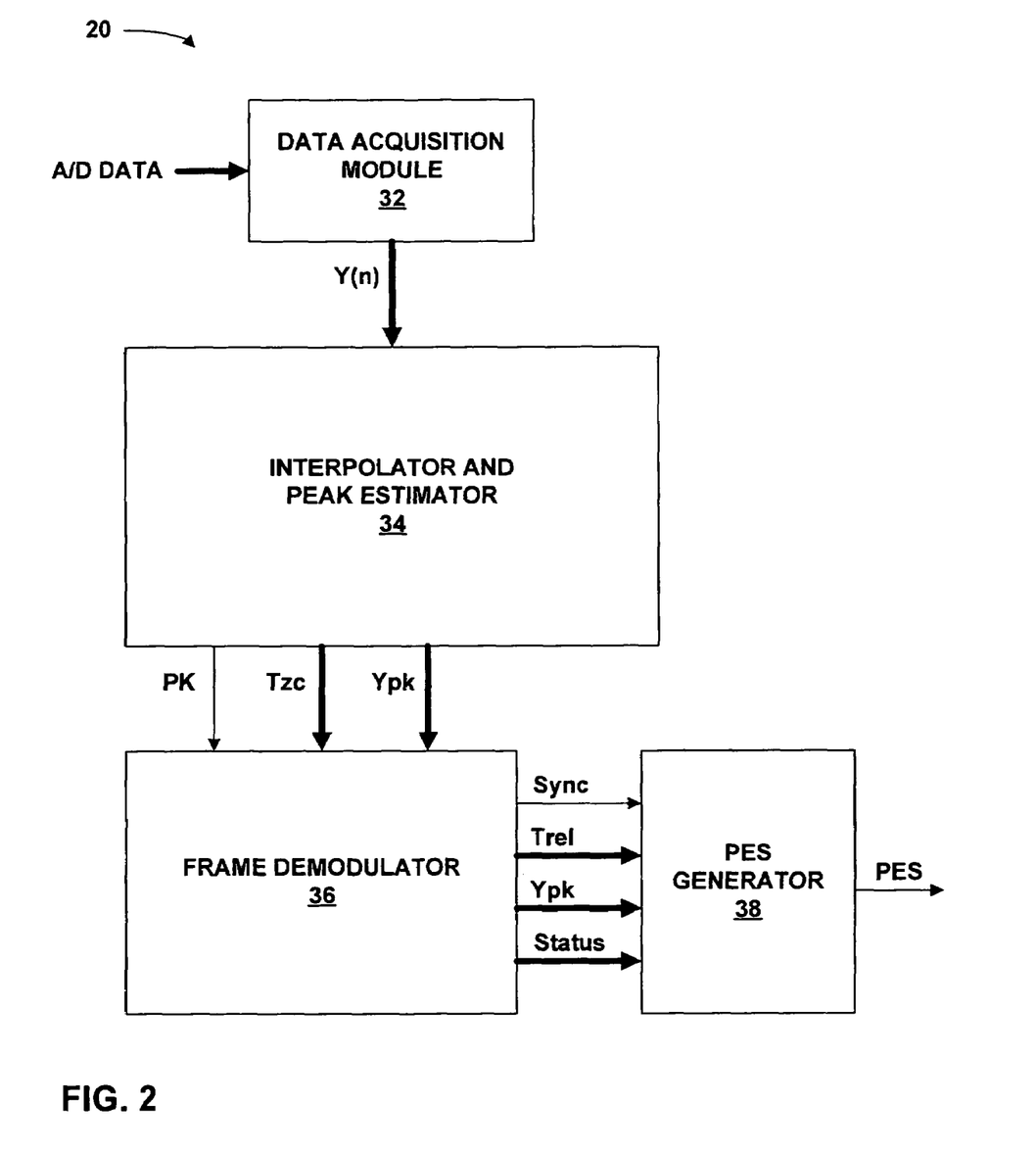
FIG. 2 is a block diagram illustrating a digital signal processor from the playback signal processing system of FIG. 1 in greater detail.

FIG. 2 is a block diagram illustrating DSP 20 of playback signal processing system 10 in greater detail. DSP 20 includes a data acquisition module 32, an interpolator and peak estimator 34, a frame demodulator 36, and a PES generator 38. Components 32, 34, 36, and 38 may be implemented in DSP circuitry 24 controlled by PLD 22 (FIG. 1).

Data acquisition module 32 receives the playback signal as A/D data, e.g., in the form of digital samples generated by A/D converter 18. Data acquisition module 32 removes a DC voltage offset from the A/D data. Furthermore, data acquisition module 32 may include a finite impulse response (FIR) filter, which provides noise filtering and signal shaping to the A/D data. Data acquisition module 32 outputs sampled data points Y(n) to interpolator and peak estimator 34.

Interpolator and peak estimator 34 continuously selects the sampled data points Y(n) to identify the data points in proximity to a desired peak to be detected in the playback signal. Interpolator and peak estimator 34 then calculates a value of the desired signal peak based on an interpolation of the identified data points. The value of the desired signal peak may comprise a signal peak time and/or a signal peak amplitude.

In one embodiment, interpolator and peak estimator 34 may identify exactly three data points in proximity to a desired peak and perform quadratic interpolation on the three data points. In that case, interpolator and peak estimator 34 selects one of the sampled data points Y(n) at each sample period and computes coefficients of a quadratic curve, e.g., $At^2+Bt+C$, for each set of three sampled data points. An internal memory (not shown) may store previous data samples, e.g., Y(n−1) and Y(n−2), used to compute the quadratic curve.

A highly accurate signal peak value may be obtained by identifying the three data points in closest proximity to the desired peak. In order to determine the data points in closest proximity to the peak, interpolator and peak estimator 34 may eliminate sampled data points with amplitudes less than a predefined amplitude. Eliminating data points with relatively low amplitudes prevents false peak detection from noise within the playback signal. Further, a value of the quadratic coefficient B may be used as an estimate of the slope of the playback signal. Interpolator and peak estimator 34 may verify that a sign change occurs in the coefficient B. Once a sign change has been detected, a value of |B| can be minimized to determine the three sampled data points in closest proximity to the desired peak.

In other embodiments, more than three data points may be identified in proximity to a desired peak to be detected. In that case, a higher order interpolation scheme may be used to calculate a value for the signal peak. For example, interpolator and peak estimator 34 may identify four data points and apply cubic interpolation to the four data points to determine an accurate peak value.

Interpolator and peak estimator 34 outputs a peak ready flag PK, a peak time $T_{zc}$, and a peak amplitude $Y_{pk}$ to frame demodulator 36. Frame demodulator 36 detects a servo pattern based on the amount of time between identified signal peaks in the playback signal. Servo frame boundaries may also be identified based on an order of the detected servo patterns. Frame demodulator 36 outputs a servo frame boundary identifier Sync, a relative time value $T_{rel}$, the peak amplitude $Y_{pk}$, and a status signal Status. The frame boundary identifier Sync holds a value of 1 when a servo frame boundary has been identified based on the order of the servo pattern. When a full frame has not been detected the frame identifier holds a value of 0. $T_{rel}$ is a time value relative to the detection of a full servo frame. When a servo frame boundary is detected, a base time for the next servo frame is captured from the last peak time value, $T_{zc}$. At each subsequent peak, a relative time $T_{rel}$ from the servo frame boundary is calculated and recorded. Once a full servo frame has been detected, $T_{rel}$ is reset to zero.

PES generator 38 generates a PES based on relative time $T_{rel}$ values from frame demodulator 36 for a sequence of peaks identified in the playback signal by interpolator and peak estimator 34. The Sync signal from frame demodulator 36 may trigger reading of the relative time data to calculate the PES. The PES may be used to verify that the time-based servo pattern is properly recorded on the data storage medium or may be used to locate a data head relative to a specific data track also recorded on the data storage medium.

Figure 3:
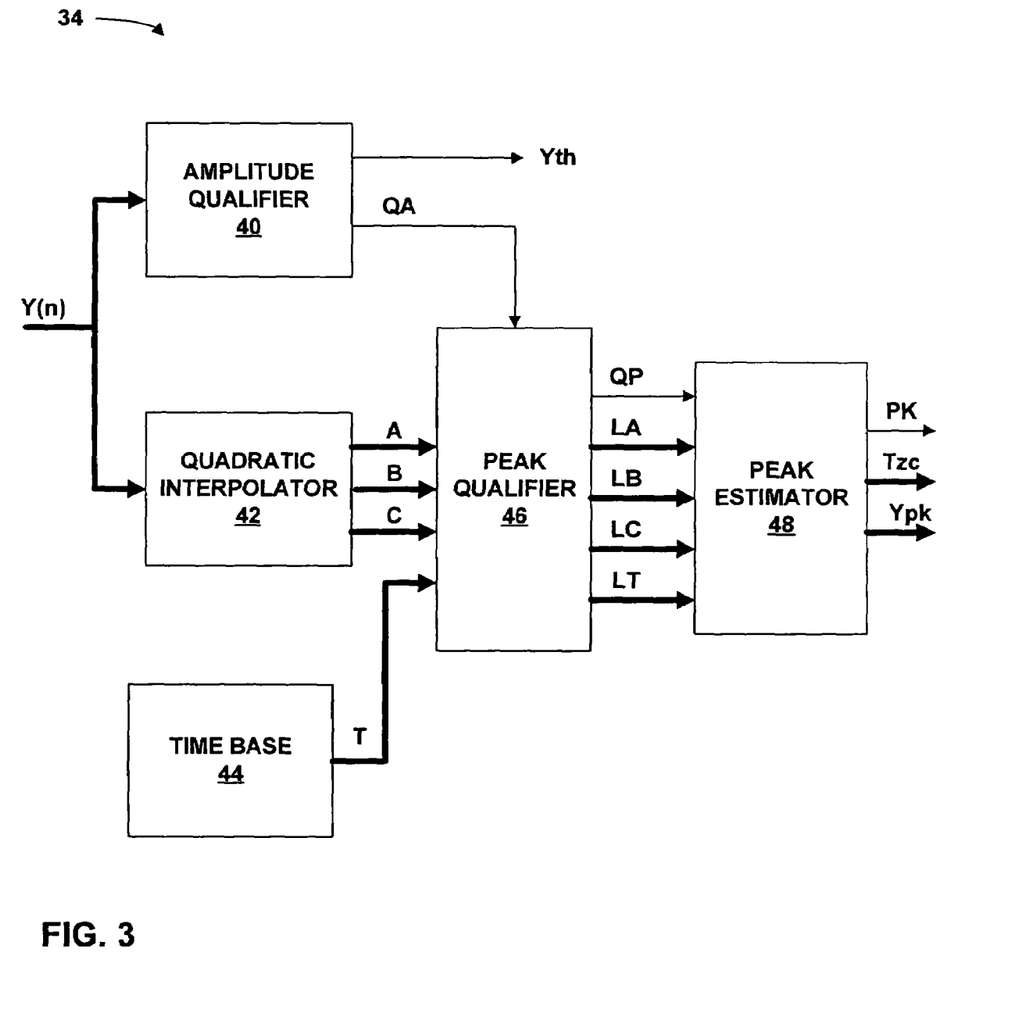
FIG. 3 is a block diagram illustrating an interpolator and peak estimator from the digital signal processor of FIG. 2 in greater detail.

FIG. 3 is a block diagram illustrating interpolator and peak estimator 34 from FIG. 2 in greater detail. In the embodiment illustrated in FIG. 3, interpolator and peak estimator 34 calculates a value for a desired peak to be detected in the playback signal based on quadratic interpolation of three data points in closest proximity to the peak. Again, in other embodiments, higher order interpolation schemes that require more than three data points may be used, such as cubic interpolation, which requires four data points.

Interpolator and peak estimator 34 includes an amplitude qualifier 40, a quadratic interpolator 42, a time base module 44, a peak qualifier 46, and a peak estimator 48. Amplitude qualifier 40 selects a sampled data point from Y(n) at each sample period and compares an amplitude of the selected data point to a predetermined amplitude threshold value $Y_{th}$. Amplitude qualifier 40 outputs a qualified amplitude signal QA to enable peak qualifier 46 for each sampled data point with amplitude greater than the threshold value.

Amplitude qualifier 40 checks that the amplitude of a current data point is larger than the threshold value. The minimum amplitude requirement can prevent false identification of noise within the playback signal as a signal peak. Furthermore, amplitude qualifier 40 waits for a positive peak to start and end, or a negative peak to start and end before qualifying the amplitude of the data point. In some cases, amplitude qualifier 40 tracks the amplitude values of the sampled data points and computes a moving average of the amplitudes. The average may be used to modify the threshold value. For example, once a positive peak or a negative peak has ended, a maximum amplitude value may be set to the current data point's amplitude value. The threshold value may then be changed to a percentage, e.g., 50%, of the maximum amplitude value prior to the start of the next peak.

Quadratic interpolator 42 selects one of the sampled data points Y(n) at each sample period and computes coefficients of a quadratic curve for each set of three sampled data points. An internal memory (not shown) may be used to store the previously selected sampled data points, e.g., Y(n−1) and Y(n−2), to compute the quadratic curve. The coefficient values are then output to peak qualifier 46 to determine which set of three data points includes the three data points in closest proximity to the desired peak. The coefficients are computed based on a predictive quadratic curve.

$$p(t) = At^2 + Bt + C \quad (1)$$

The derivative of the predictive quadratic curve is a linear function. The derivative may be manipulated to provide peak time and amplitude estimates.

$$\frac{d}{dt} p(t) = 2At + B = 0 \quad (2)$$

$$t^* = \frac{-B}{2A} \quad (3)$$

$$p(t^*) = At^{*2} + Bt^* + C \quad (4)$$

A set of three consecutive data points is used to set up a linear system of equations.

$$\begin{bmatrix} y_n \\ y_{n-1} \\ y_{n-2} \end{bmatrix} = \begin{bmatrix} t_n^2 & t_n & 1 \\ t_{n-1}^2 & t_{n-1} & 1 \\ t_{n-2}^2 & t_{n-2} & 1 \end{bmatrix} \begin{bmatrix} A \\ B \\ C \end{bmatrix} = M \begin{bmatrix} A \\ B \\ C \end{bmatrix} \quad (5)$$

In order to solve the system of equations (5) for the coefficients, the time scale must be adjusted. The playback signal is sampled at the sample clock rate, e.g., 50 MHz. The uniform sampling rate allows the sample period to be factored out of the time values for the three sampled data points.

$$t_n = +1$$
$$t_{n-1} = 0 \quad (6)$$
$$t_{n-2} = -1$$

Plugging the adjusted time values into the linear system of equations (5) gives the system of equations shown below.

$$\begin{bmatrix} y_n \\ y_{n-1} \\ y_{n-2} \end{bmatrix} = \begin{bmatrix} 1 & 1 & 1 \\ 0 & 0 & 1 \\ 1 & -1 & 1 \end{bmatrix} \begin{bmatrix} A \\ B \\ C \end{bmatrix} = M \begin{bmatrix} A \\ B \\ C \end{bmatrix} \quad (7)$$

The system of equations (7) comprises a solution:

$$\begin{bmatrix} A \\ B \\ C \end{bmatrix} = M^{-1} \begin{bmatrix} y_n \\ y_{n-1} \\ y_{n-2} \end{bmatrix}. \quad (8)$$

$M^{-1}$ exists provided that M is nonsingular. Since M is non-singular, $M^{-1}$ exists and the solution (8) becomes $$\begin{bmatrix} A \\ B \\ C \end{bmatrix} = \frac{1}{2} \begin{bmatrix} 1 & -2 & 1 \\ 1 & 0 & -1 \\ 0 & -2 & 0 \end{bmatrix} \begin{bmatrix} y_n \\ y_{n-1} \\ y_{n-2} \end{bmatrix} \quad (9)$$

or $$A = \frac{1}{2}(y_n - 2y_{n-1} + y_{n-2}) \quad (10)$$

$$B = \frac{1}{2}(y_n - y_{n-2})$$

$$C = y_{n-1}$$

Quadratic interpolator 42 provides peak qualifier 46 with the values of A, B, and C computed based on equations (10) for each set of three sampled data points.

Peak qualifier 46 is enabled by the QA output from amplitude qualifier 40. Once enabled, peak qualifier 46 determines which set of data points includes the three data points in closest proximity to the desired signal peak. For example, peak qualifier 46 can make this determination based on an absolute value of the coefficient B. The coefficient B represents an estimate of the slope of the playback signal at time $t_{n-1}$. The slope of the playback signal at the desired peak is zero. Therefore, the slope of the playback signal before the desired peak has a sign opposite the slope of the playback sign after the desired peak. Peak qualifier 46 stores the coefficient values for each set of three data points and verifies that a sign changes occurs in the coefficient B. The |B| values are then minimized to determine the set of three data points that includes the three data points in closest proximity to the desired peak.

Time base module 44 provides peak qualifier 46 with a time base T. Time base module 44 has the same frequency as the original clock input to DSP 20 (FIG. 1). Interpolation increases the number of data points and, therefore, the number of bits of time must also be increased. For example, six bits may be added after the decimal point of the time value, i.e., ±b.bbbbbb where b is a binary digit 0 or 1. The range of this representation is −2.000 to +1.984 with an effective precision of 1/64 or 0.015625. The peak time estimate is added to a positive integer which counts the number of sample clock intervals. The resulting time is a high precision estimate with an effective time resolution of 0.3125 nanoseconds, which is equivalent to an ultra high speed sample clock of 3.20 GHz. Importantly, the invention can facilitate such improved accuracy at clock rates of 50 MHz or less. Of course, the invention may also be used to improve peak estimation at any clock rate.

Peak qualifier 46 latches the coefficients A, B, and C for the set of three data points in closest proximity to the desired peak, as well as the time base T. The latched values are output to peak estimator 48. In addition, peak qualifier 46 outputs a qualified peak signal QP to enable peak estimator 48. The peak is qualified once the three sampled data points in closest proximity to the desired peak are identified.

Peak estimator 48 calculates a peak time value $T_{zc}$ and a peak amplitude value $Y_{pk}$ for the desired peak. In some cases, peak time values for a sequence of peaks identified within the playback signal may be used to generate a PES. The peak amplitude value may be used to verify that an amplitude requirement of the time-based servo pattern has been meet. Peak estimator 48 applied the received latched coefficient values to determine $T_{zc}$ based on equation (2) and $Y_{pk}$ based on equation (3). Peak estimator 48 also outputs a peak ready flag or indicator PK, used to determine the time-based servo pattern and servo frame boundaries.

Figure 4:
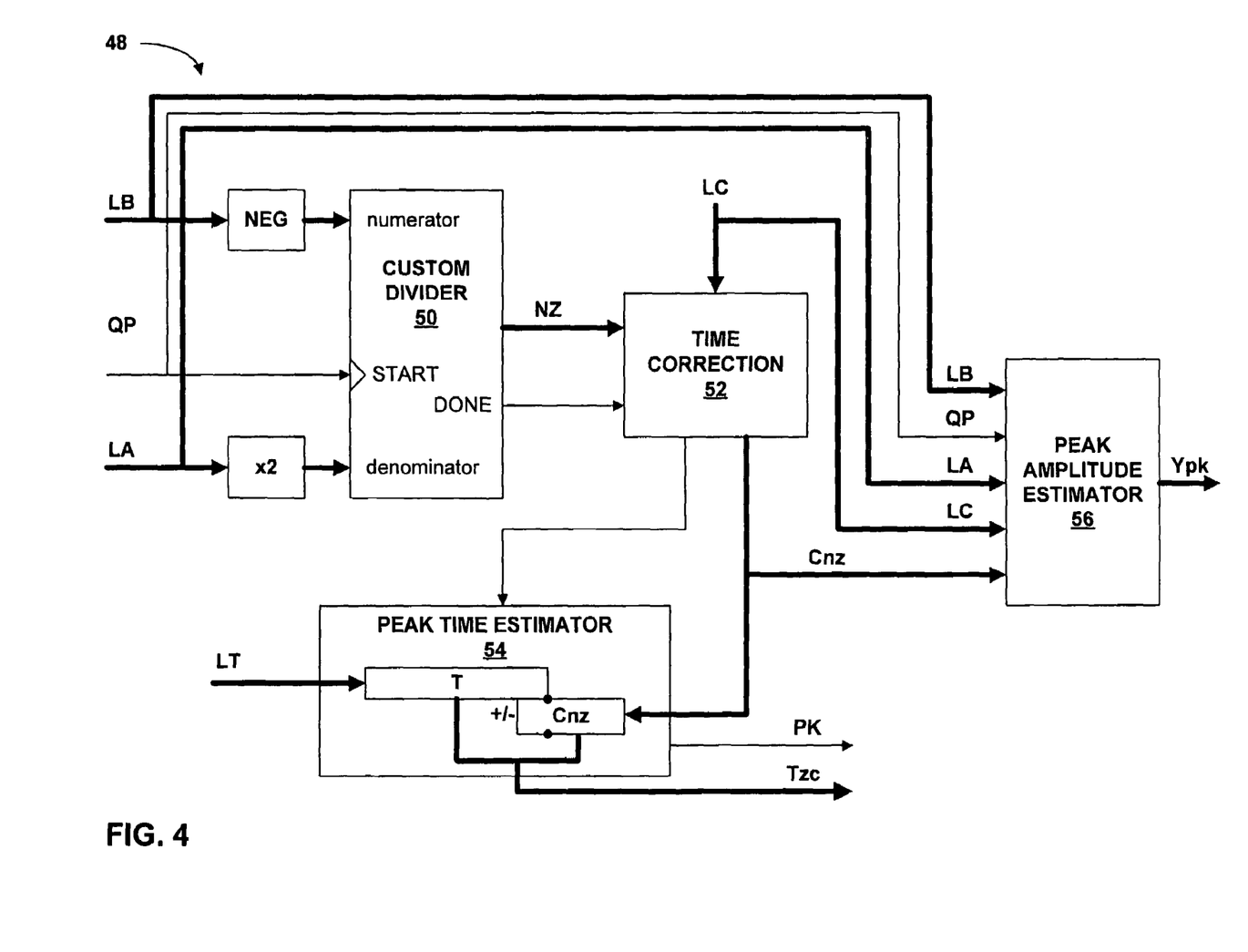
FIG. 4 is a block diagram illustrating a peak estimator from the interpolator and peak estimator of FIG. 3 in greater detail.

FIG. 4 is a block diagram illustrating peak estimator 48 from FIG. 3 in greater detail. Peak estimator 48 comprises a custom divider 50, a time correction module 52, a peak time estimator 54, and a peak amplitude estimator 56.

Custom divider 50 is enabled by the qualified peak signal QP from peak qualifier 46 (FIG. 3). Once enabled, custom divider 50 inputs a negative latched B coefficient as the numerator and a doubled latched A coefficient as the denominator. In that way, custom divider 50 computes equation (3). The dividing circuitry is customized for a fixed point application. In addition, custom divider 50 uses a reciprocal table and a single quadrant multiplier to improve the speed of calculation. Custom divider 50 outputs a zero crossing time estimate NZ to time correction module 52. Time correction module 52 inputs the zero crossing time estimate NZ and the latched C coefficient, and outputs a corrected zero crossing time estimate $C_{nz}$. Time correction module 52 corrects inaccuracies in the zero crossing time estimate. The correction function may be implemented in a look-up table.

Peak time estimator 54 calculates a peak time estimate $T_{zc}$ for the three data points in closest proximity to the desired peak and generates a peak ready flag or indicator PK. Time correction module 52 enables peak time estimator 54. Peak time estimator 54 inputs the corrected zero crossing time $C_{nz}$ and a latched time base T. The corrected zero crossing time estimate is added to the time base in a fixed point arithmetic operation in peak time estimator 54. Peak time estimate $T_{zc}$ is equal to the addition of $C_{nz}$ and T.

Peak amplitude estimator 56 calculates a peak amplitude value $Y_{pk}$ for the three data points in closest proximity to the desired peak to be detected. Peak amplitude estimator 56 inputs the latched quadratic coefficients A, B, and C, the qualified peak signal QP, and the corrected zero crossing time $C_{nz}$. The QP signal enables peak amplitude estimator 56. Once enabled, peak amplitude estimator 56 computes equation (4) for the corrected time $C_{nz}$ using the latched coefficient values, i.e., $Y_{pk}=LA*C_{nz}^2+LB*C_{nz}+LC$.

Figure 5:
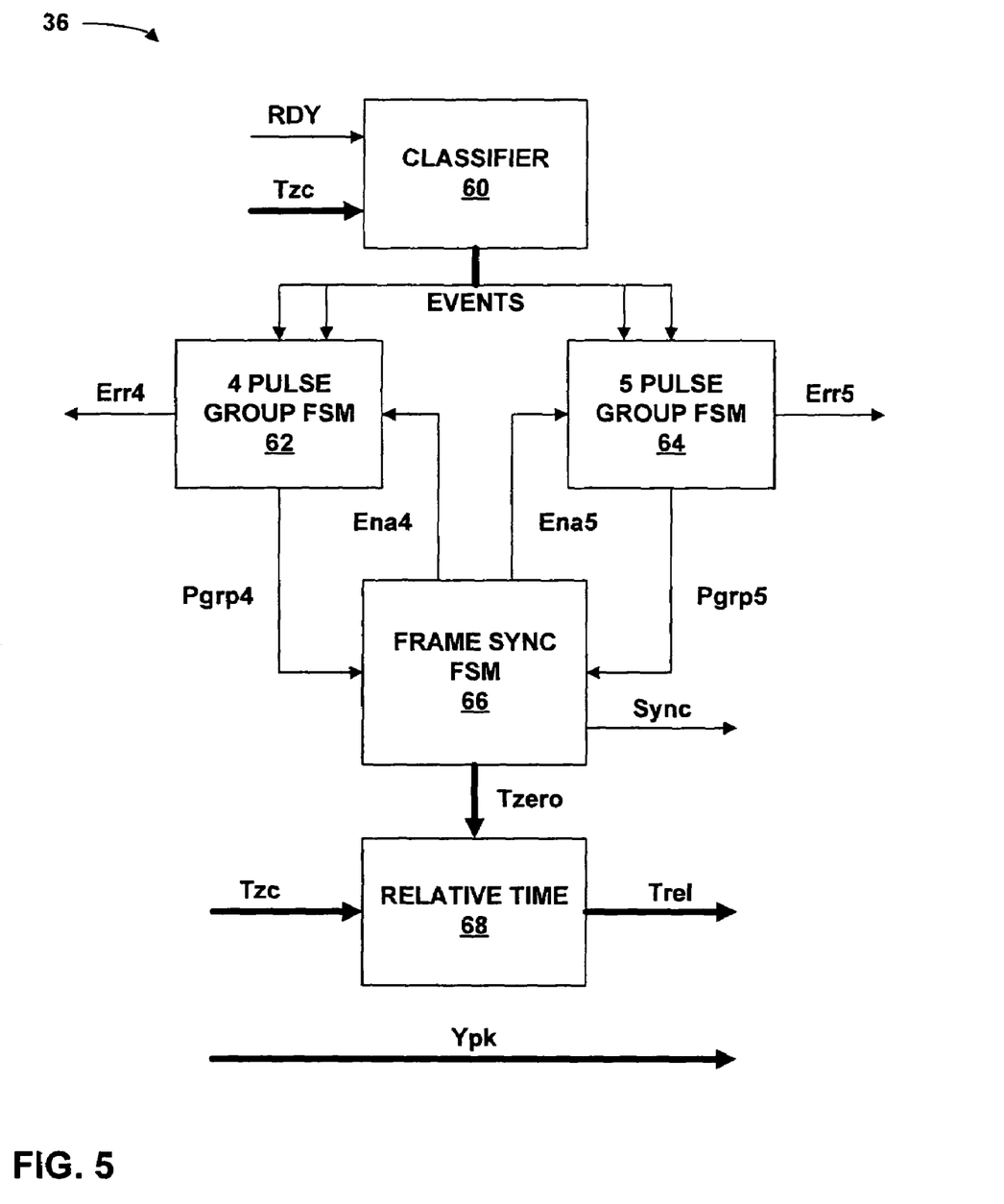
FIG. 5 is a block diagram illustrating a frame demodulator from the digital signal processor of FIG. 2 in greater detail.

FIG. 5 is a block diagram illustrating frame demodulator 36 from FIG. 2 in greater detail. Frame demodulator 36 identifies servo patterns based on differences between the peak time values of successive signal peaks in a playback signal of a time-based servo pattern. Furthermore, servo frame boundaries can be detected based on an order of identified servo patterns. Frame demodulator 36 may comprise several finite state machines (FSMs) designed for specific servo patterns and a specific servo frame configuration. The illustrated embodiment is one example of frame demodulator and should not be read as limiting the invention in any way. The example of FIG. 5 may be used to read servo patterns characterized by four leading marks and five trailing marks, such as "////\\\\\".

In this example, frame demodulator 36 comprises a classifier 60, a four-pulse group FSM 62, a five-pulse group FSM 64, a frame sync FSM 66, and a relative time module 68. Classifier 60 characterizes the time between adjacent signal peaks using knowledge of the physical time-based servo pattern recorded on a data storage medium. For example, classifier 60 may include a plurality of events defined by the difference between calculated peak times of two successive signal peaks in a feedback signal. The defined events relate to a specific servo pattern being read by servo head 12 (FIG. 1).

As an example, a time-based servo pattern recorded on a data storage medium includes recorded pulses with widths ranging from 1.7 μm to 2.5 μm. The center to center spacing of the pulses ranges from 4.75 μm to 5.25 μm. The pulses are organized in groups of four or five with inter-group gaps no greater than 100 μm. The measurements associated with the recorded servo pattern may be used to define the events that characterize the time between adjacent signal peaks. A time difference that equates to less than 1.5 μm may be considered noise, although any noise threshold may be defined in different implementations. A time difference equating to between 1.5 μm and 2.7 μm may comprise a width of a servo pattern pulse. In that case, adjacent signal peaks 2.7 μm to 5.75 μm apart comprise a space between two successive servo pattern pulses. A difference between peaks ranging from 5.75 μm to 100 μm comprises a gap between groups of four pulses or groups of five pulses. Any distance greater than 100 μm may be considered a fade.

Classifier 60 sends the detected servo pattern organized into events to both four-pulse group FSM 62 and five-pulse group FSM 64. Four-pulse group FSM 62 outputs $P_{grp}4$ when a received pattern includes four pulse widths followed by a gap, each of the pulse widths separated by a space. Four-pulse group FSM 62 outputs an error signal, Err4, when the received pattern of events doesn't correspond to the expected pattern. If another space and a fifth pulse width follow the fourth pulse width before the gap, five-pulse group FSM 64 outputs $P_{grp}5$. When five-pulse group FSM 64 receives a pattern of events that does not correspond to the expected pattern, an error signal Err5 is output.

Frame sync FSM 66 receives the $P_{grp}4$ and $P_{grp}5$ signals from four-pulse group FSM 62 and five-pulse group FSM 64, respectively, signaling a group of four or five pulses. Frame sync FSM 66 detects a servo frame boundary based on a predefined servo frame. For example, a time-based servo pattern may define a frame as a pulse group sequence of two groups of five pulses followed by two groups of four pulses. In that case, frame sync FSM 66 looks for the predefined pattern of pulse groups and enables four-pulse group FSM 62 or five-pulse group FSM 64 based on what pulse group is needed next to define the servo frame.

Frame sync FSM 66 detects a servo frame boundary when the predefined pulse group pattern that comprises the servo frame is received. Frame sync FSM 66 then sets $T_{zero}$ to $T_{zc}$ and outputs $T_{zero}$ to relative time module 68. Relative time module 68 defines a relative time $T_{rel}$ based on a difference between $T_{zero}$ and $T_{zc}$. When a servo frame boundary is detected, $T_{rel}$ is reset to zero and a base time for the next servo frame is captured from $T_{zc}$. At each subsequent pulse, $T_{rel}$ is calculated relative to the servo frame boundary base time and stored by relative time module 68. Furthermore, frame sync FSM 66 outputs a Sync signal to trigger PES generator 38 (FIG. 2) to read the relative time data used to calculate a PES.

Figure 6:
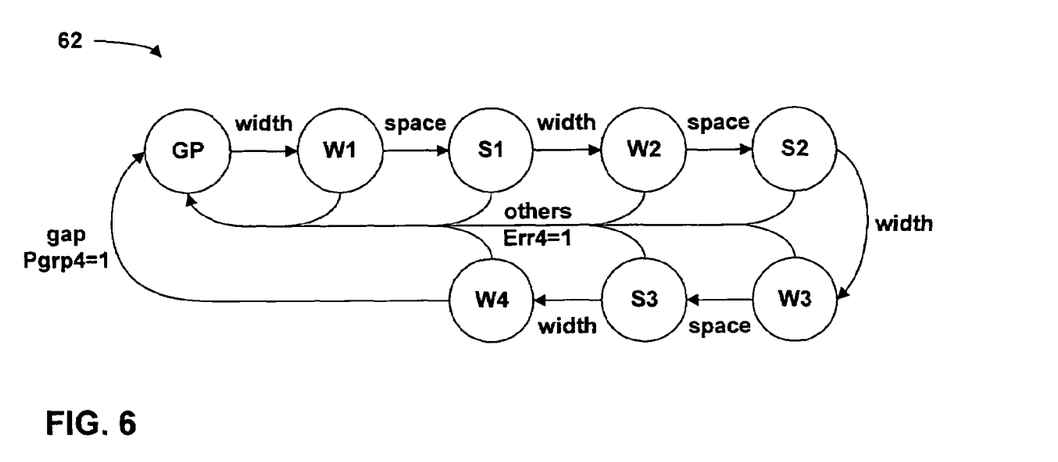
FIG. 6 illustrates an exemplary four-pulse group finite state machine (FSM) from the frame demodulator of FIG. 5 in greater detail.

FIG. 6 illustrates four-pulse group FSM 62 from FIG. 5 in greater detail. Four-pulse group FSM 62 receives event data related to a playback signal of a time-based servo pattern from classifier 60. Four-pulse group FSM 62 needs to receive a first pulse width (W1) followed by a space (S1), a second pulse width (W2) followed by a second space (S2), a third pulse width (W3) followed by a third space (S3), and a fourth pulse width (W4) followed by a gap (GP). Once the gap event is received, a four-pulse group signal $P_{grp}4$ is generated to be sent to frame sync FSM 66 (FIG. 5). As illustrated, if an event is received that does not correspond with the event order required by four-pulse group FSM 62, an error signal Err4 is generated and FSM 62 returns to the GP state until another pulse width is received.

Figure 7:
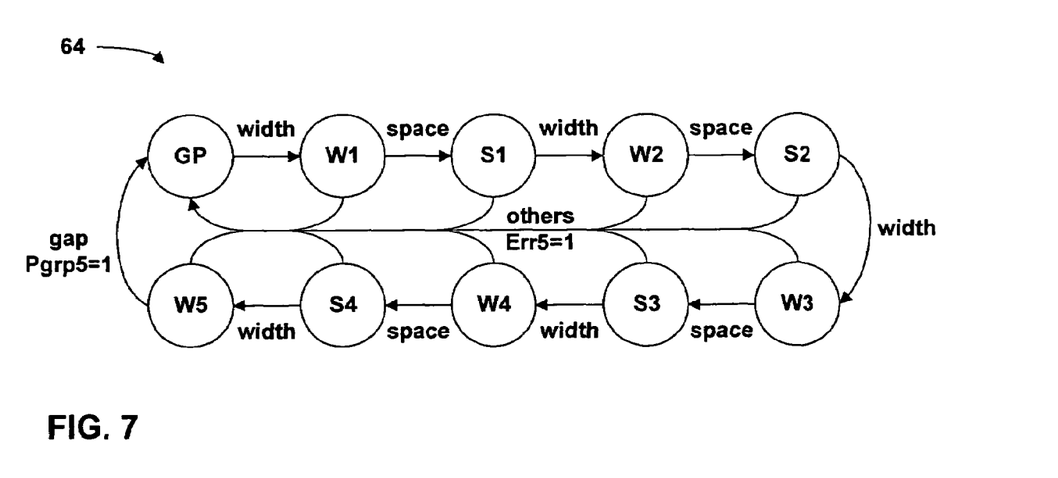
FIG. 7 illustrates an exemplary five-pulse group FSM from the frame demodulator of FIG. 5 in greater detail.

FIG. 7 illustrates five-pulse group FSM 64 from FIG. 5 in greater detail. Five-pulse group FSM 64 receives event data related to a time-based servo pattern from classifier 60. Five-pulse group FSM 64 needs to receive a first pulse width (W1) followed by a space (S1), a second pulse width (W2) followed by a second space (S2), a third pulse width (W3) followed by a third space (S3), a fourth pulse width (W4) followed by a fourth space (S4), and a fifth pulse width (S5) followed by a gap (GP). Once the gap event is received, a five-pulse group signal $P_{grp}5$ is generated to be sent to frame sync FSM 66 (FIG. 5). As illustrated, if an event is received that does not correspond with the event order required by five-pulse group FSM 64, an error signal Err5 is generated and the FSM returns to the GP state until another pulse width is received.

Figure 8:
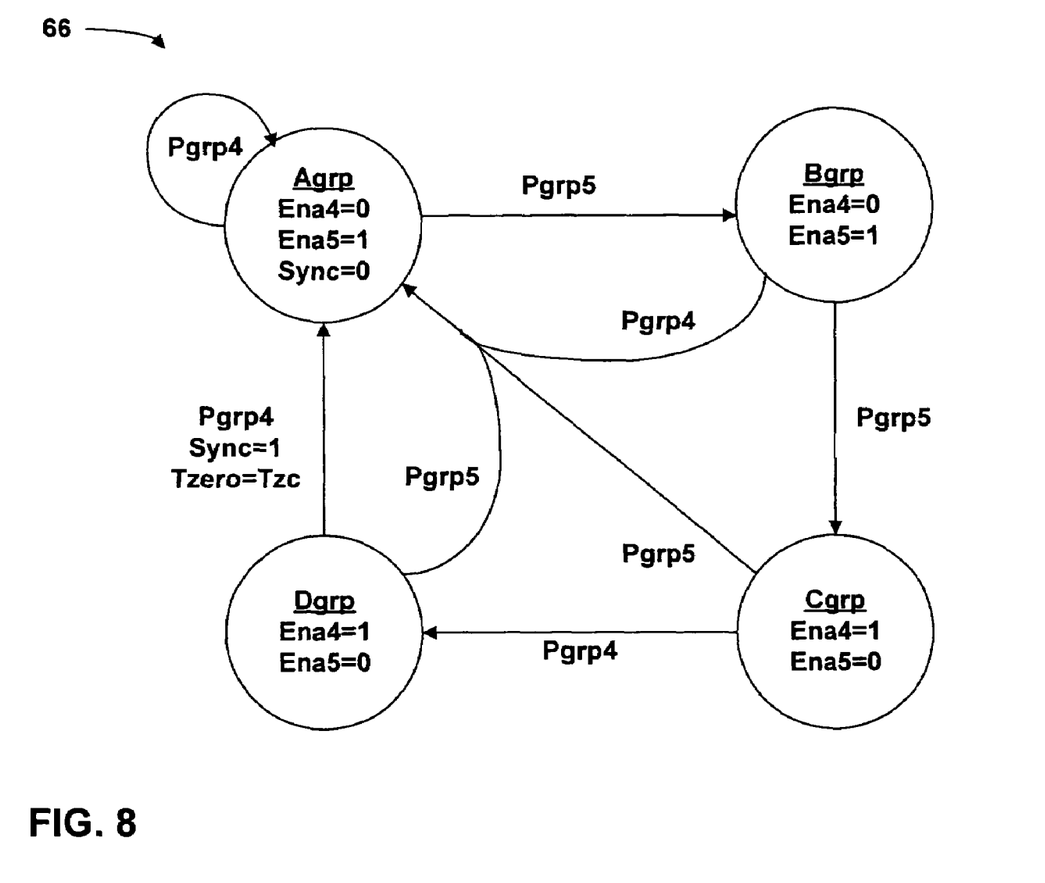
FIG. 8 illustrates an exemplary frame sync FSM from the frame demodulator of FIG. 5 in greater detail.

FIG. 8 illustrates frame sync FSM 66 from FIG. 5 in greater detail. As described above, frame sync FSM 66 depends on a servo frame defined by a time-based servo pattern. In this case, a servo frame comprises two groups of five pulses followed by two groups of four pulses. In other embodiments, the servo frame may comprise any combination of pulse groups that include any number of pulses, e.g., corresponding to any number of marks. Moreover, the marks may be arranged in various other manners, such as N-shaped servo markings, servo markings such as "<<<>>>" or a wide variety of other servo marking arrangements. The invention can improve signal peak detection in these and other time-based servo signal arrangements.

Frame sync FSM 66 needs to receive two five-pulse group signals $P_{grp}5$ followed by two four-pulse group signals $P_{grp}4$. At each of the states $A_{grp}$, $B_{grp}$, $C_{grp}$, and $D_{grp}$, the pulse group FSM of the pulse group needed next in the servo frame is enabled. For example, the $B_{grp}$ state enables five-pulse group FSM 64 by setting Ena5 to a binary value of 1 and disables four-pulse group FSM 62 by setting Ena4 to a binary value of 0. If a pulse group is received that does not correspond to the order of the predefined servo frame, frame sync FSM 66 returns to the $A_{grp}$ and waits to receive a five-pulse group signal to restart a servo frame. For example, if a four-pulse group is received at the $B_{grp}$, frame sync FSM 66 returns to the $A_{grp}$.

Once a four-pulse group signal is received at the $D_{grp}$, a servo frame boundary is detected, the Sync signal is enabled, and $T_{zero}$ is set to $T_{zc}$. Frame sync FSM 66 then returns to the $A_{grp}$ to wait for the next servo frame. The $T_{zero}$ output of frame sync FSM 66 is used to generate time values relative to the servo frame boundary. The Sync signal is used to trigger PES generator 38 (FIG. 2) to read the relative time values from frame demodulator 36.

Figure 9:
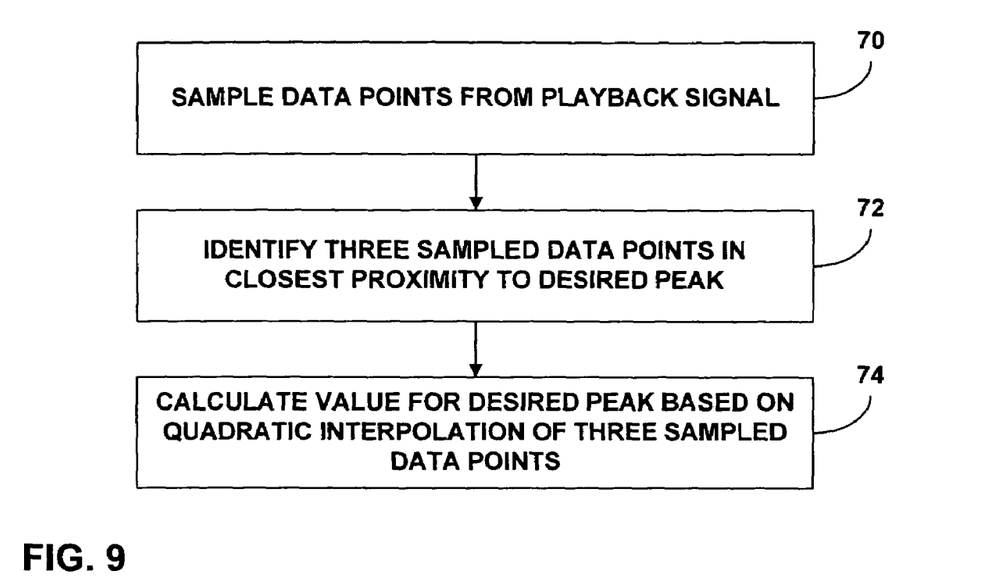
FIG. 9 is a flow chart illustrating a method of processing a playback signal from a time-based servo pattern in the playback processing system from FIG. 1.

FIG. 9 is a flow chart illustrating a method of processing a playback signal from a time-based servo pattern in playback processing system 10 (FIG. 1). A/D converter 18 samples data points from the playback signal (70) to generate sampled data points Y(n). Interpolator and peak estimator 34, included in DSP 20, continuously selects one of the sampled data points at each sampling period. Three of the sampled data points are identified as being in closest proximity to a desired peak to be detected in the playback signal (72). Interpolator and peak estimator 34 then identifies a value of the desired peak based on quadratic interpolation of the three sample data points (74). In other embodiments, more data points may be identified in proximity to the desired peak to be detected. In that case, a higher order interpolation scheme is also used.

Figure 10:
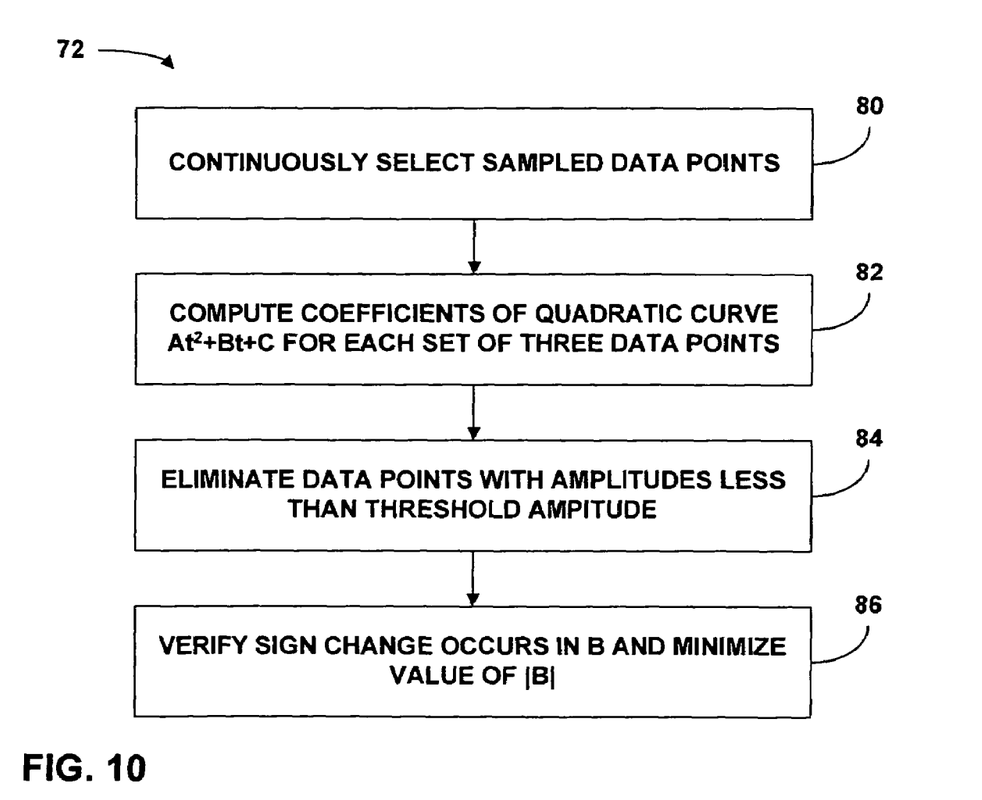
FIG. 10 is a flow chart illustrating a method of identifying three sampled data points from the method of FIG. 9 in greater detail.

FIG. 10 is a flow chart illustrating a method of identifying the three sampled data points in closest proximity to the desired peak, i.e., step (72) from FIG. 9. Interpolator and peak estimator 34, illustrated in FIG. 3, continuously selects the sampled data points Y(n) (80). Quadratic interpolator 42 computes coefficients of a quadratic curve, i.e., $At^2+Bt+C$, for each set of three data points (82). An internal memory may be used to store previous sampled data points to compute the quadratic coefficients. Amplitude qualifier 40 eliminates the selected sampled data points with amplitudes less than a predefined threshold amplitude (84). In some cases, amplitude qualifier 40 may track the data sample signal peaks and modify the threshold amplitude based on a moving average calculated for the signal peaks. Eliminating low amplitude data points reduces computation in peak qualifier 46 and reduces false peak detection from noise.

Peak qualifier 46 is enabled by a qualified amplitude signal QA from amplitude qualifier 40. Once enabled, peak qualifier 46 inputs the coefficients computed by quadratic interpolator 42. Peak qualifier 46 verifies a signal change in the B coefficient and minimizes an absolute value of the B coefficient (86). The quadratic curve with the smallest value of |B| is a function of the three data points in closest proximity to the desired peak to be detected.

Various embodiments of the invention have been described. For example, a playback signal processing system has been described that accurately detects peak values in a playback signal of a time-based servo pattern recorded on a data storage medium. Data points in proximity to a desired peak to be detected in the playback signal are identified. Values for the desired peak are calculated based on an interpolation of the identified data points. Techniques for identifying servo patterns and servo frames based on time differences between signal peaks in the playback signal have also been described. Furthermore, the process of generating a PES based on time values relative to a servo frame boundary has been described for both a servo verify system and a data read/write system.

Nevertheless, various modifications may be made without departing from the scope of the invention. For example, the playback signal processing system has generally been described as identifying exactly three data points in closest proximity to a desired peak and calculating a value of the desired peak based on a quadratic interpolation of the three data points. However, any number of data points may be identified in proximity to a desired peak to be detected in a playback signal and a value of the desired peak may be calculated based on a higher order interpolation scheme corresponding to the number of data points identified. Furthermore, a frame demodulator may be designed to detect any predefined servo frame comprising an order of servo patterns including any number of pulses. Other servo frame arrangements may also be used in accordance with the invention. These and other embodiments are within the scope of the following claims.

The invention claimed is:

1. A method for processing a playback signal of a time-based servo pattern, the method comprising:
   identifying at least three data points in proximity to a desired peak to be detected within the playback signal of the time-based servo pattern;
   calculating a value forte desired peak based on interpolation of the at least three data points; and
   generating a position error signal (PES) for the time-based servo pattern based in part on the value calculated for the desired peak.

2. The method of claim 1, wherein identifying the at least three data points comprises identifying at least three data points in closest proximity to the desired peak.

3. The method of claim 2, wherein exactly three data points are identified and the value for the desired peak is calculated based on quadratic interpolation of the three data points.

4. The method of claim 3, wherein identifying the three data points comprises continuously selecting data points from the playback signal and computing a quadratic curve for each set of three continuously selected data points.

5. The method of claim 4, wherein identifying the three data points further comprises eliminating data points with amplitudes less than a predefined amplitude and minimizing an absolute value of a slope of the quadratic curve.

6. The method of claim 1, further comprising:
   identifying a sequence of peaks within the playback signal by identifying at least three data points in proximity to each of the sequence of peaks;
   calculating values for each of the sequence of peaks based on interpolations of the data points; and
   generating the PES based on the values calculated for each of the sequence of peaks.

7. The method of claim 6, further comprising detecting the PES over a substantial length of a data storage medium on which the time-based servo pattern is recorded and verifying that the PES remains substantially the same over the substantial length of the data storage medium.

8. The method of claim 6, further comprising detecting the PES and moving a data head in a transverse direction aver a data storage medium on which the time-based servo pattern is recorded based on the PES.

9. A system to process a playback signal that corresponds to a time-based servo pattern recorded on a data storage medium comprising:
   a sampler to sample data points from the playback signal of the time-based servo pattern recorded on the medium;
   an interpolator to identify at least three sampled data points in proximity to a desired peak to be detected within the playback signal;

a peak estimator to calculate a value for the desired peak based on the at least three sampled data points; and a position error signal (PES) generator to generate a PES based in part on the value calculated for the desired peak.

10. The system of claim 9, wherein the interpolator comprises a quadratic interpolator that identifies exactly three sampled data points in closest proximity to the desired peak.

11. The system of claim 10, wherein the quadratic interpolator continuously selects the sampled data points and computes a quadratic curve for each set of three sampled data points.

12. The system of claim 11, wherein the quadratic interpolator includes an amplitude qualifier that eliminates sampled data points with amplitudes less than a predefined amplitude and a peak qualifier that minimizes an absolute value of a slope of the quadratic curve.

13. The system of claim 11, wherein the peak estimator computes a time of the desired peak based on a derivative of the quadratic curve for the three sampled data points in closest proximity to the desired peak.

14. The system of claim 9, wherein the PBS generator generates the PES based on values calculated for each of a sequence of peaks identified within the playback signal by the peak estimator.

15. The system of claim 9, further comprising a classifier to identify the time-based servo pattern based on lengths of time measured between consecutive peaks in a sequence of peaks identified within the playback signal by the peak estimator.

16. A computer-readable medium comprising instructions that when executed in a programmable processor process a playback signal of a time-based servo pattern, wherein the instructions cause the programmable processor to:

identify at least three data points in proximity to a desired peak to be detected within the playback signal of the time-based servo pattern;

calculate a value for the desired peak based on interpolation of the at least three data points; and generate a position error signal (PES) for the time-based servo pattern based in part on the value calculated for the desired peak.

17. The computer-readable medium of claim 16, wherein the instructions cause the programmable processor to identify exactly three data points in closest proximity to the desired peak and calculate the value of the desired peak based on quadratic interpolation of the three data points.

18. The computer-readable medium of claim 17, wherein the instructions that identify the three data points comprise instructions that cause the programmable processor to continuously select data points from the playback signal and compute a quadratic curve for each set of three continuously selected data points.

19. The computer-readable medium of claim 18, wherein the instructions that identify the three data points further comprise instructions that cause the programmable processor to eliminate data points with amplitudes less than a predefined amplitude and minimize an absolute value of a slope of the quadratic curve.

20. The computer-readable medium of claim 16, further comprising instructions that cause the programmable processor to identify a sequence of peaks within the playback signal by identifying at least three data points in proximity to each of the sequence of peaks, calculate values for each of the sequence of peaks based on interpolations of the data points, and generate the PES based on the values for each of the sequence of peaks.

* * * * *

UNITED STATES PATENT AND TRADEMARK OFFICE
CERTIFICATE OF CORRECTION

PATENT NO. : 7,196,859 B2  Page 1 of 1
APPLICATION NO. : 10/888857
DATED : March 27, 2007
INVENTOR(S) : Alan R. Olson It is certified that error appears in the above-identified patent and that said Letters Patent is hereby corrected as shown below:

Column 12
　　Line 21, "forte" should read --for the--.
　　Line 56, "aver" should read --over--.

Column 13
　　Line 23, "PBS" should read --PES--.

Signed and Sealed this

Seventeenth Day of June, 2008

JON W. DUDAS
*Director of the United States Patent and Trademark Office*